FIG. 1

INVENTOR.
WALTER J. OLSON

FIG. 3

INVENTOR.
WALTER J. OLSON
BY Wallace and Cannon
ATTORNEYS June 16, 1953   W. J. OLSON   2,642,307
GRAB
Filed Jan. 26, 1949   6 Sheets-Sheet 4

INVENTOR.
WALTER J. OLSON
BY Wallace and Cannon
ATTORNEYS

June 16, 1953 W. J. OLSON 2,642,307
GRAB
Filed Jan. 26, 1949 6 Sheets-Sheet 5

*INVENTOR.*
WALTER J. OLSON
BY *Wallace and Cannon*
ATTORNEYS

June 16, 1953 W. J. OLSON 2,642,307
GRAB
Filed Jan. 26, 1949 6 Sheets-Sheet 6

*INVENTOR.*
WALTER J. OLSON
BY Wallace and Cannon
ATTORNEYS

Patented June 16, 1953

2,642,307

UNITED STATES PATENT OFFICE 2,642,307

GRAB

Walter J. Olson, Clifton, N. J., assignor to American Brake Shoe Company, New York, N. Y., a corporation of Delaware Application January 26, 1949, Serial No. 72,818

14 Claims. (Cl. 294—67)

This invention relates to grabs, and more particularly to grabs of the type especially well adapted for use in foundries, or similar places, to pick up and transport wheel molds or other round objects.

Various types of grabs have been heretofore known and used in the art. However, such grabs have had several inherent disadvantages such as, for example, being costly and difficult to manufacture; being difficult and impractical in construction and operation, and the like.

A primary object of my invention is to overcome these disadvantages and to afford a novel grab which may be economically manufactured and is practical and efficient in construction and operation.

Another object of my invention is to enable molds of other than the conventional form, such as, for example, wheel molds, and the like, to be picked up in a novel and expeditious manner.

Molds used in making castings commonly embody upper and lower parts which are separable from each other and are commonly referred to as the cope and drag, respectively. In many instances, and especially where larger molds are involved, a third part is disposed between the cope and the drag, and is separable therefrom, this third part being commonly referred to as the "chiller" or "chiller-ring."

As is well known to those skilled in the art the common procedure in making castings such as, for example, wheel castings, is to make the pour into a mold and then permit the mold to cool sufficiently so that the casting is hardened. After this, it is, of course, necessary to remove the casting from the mold and, in most instances, the usual procedure is to transport the mold with the casting therein to a shake-out device wherein the mold is jolted and jarred sufficiently to dislodge the casting therefrom and to clean the molding sand out of the mold or flask. In following this procedure it is often desirable to shake out the drag at one point and to deposit the cope and casting at other points, and it is an important object of my invention to enable this to be accomplished in a novel and expeditious manner.

A further object of my invention is to enable molds and the like which are separable into upper and lower portions, to be picked up as a unit in a novel and expeditious manner.

An object ancillary to the foregoing is to enable such molds to be picked up in a manner whereby the lower part may be released from the grab at will while still retaining the upper part of the separable mold in supported position in the grab.

Heretofore, it has been common practice in foundries, and the like, in picking up and transporting molds and castings to a shake-out station, to merely engage bales or hooks with trunnions projecting outwardly from the side walls of the mold or flask and to pick up and transport the mold and casting thereby. In some instances, the entire mold is thus picked up, and in other instances only the upper portion, such as the cope, or the cope and chiller-ring is picked up in this manner, together with the casting. As is well known to those skilled in the art, the cope, drag and chiller-ring in molds used in foundries are commonly open at the top and bottom and, therefore, in picking up and transporting molds and castings in this manner, the adhesion of the sand in the mold is relied upon to support the casting therein during such transportation of the mold. Obviously this involves a relatively dangerous procedure, inasmuch as a relatively light jolt or jar, during such transportation, might very well dislodge the casting from the mold and cause it to drop, thus endangering those working nearby.

It is a further important object of my invention to afford a novel grab for transporting molds and the like wherein the parts are so constituted and arranged that a casting may be positively supported in a mold being transported in a novel and expeditious manner.

Yet another object of my invention is to enable a novel grab to be constructed in such a manner that supporting means thereon may be moved into and out of supporting engagement with a mold or the like by a reciprocating plunger in a novel and expeditious manner.

Other and further objects of the present invention will be apparent from the following description and claims and are illustrated in the accompanying drawings which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
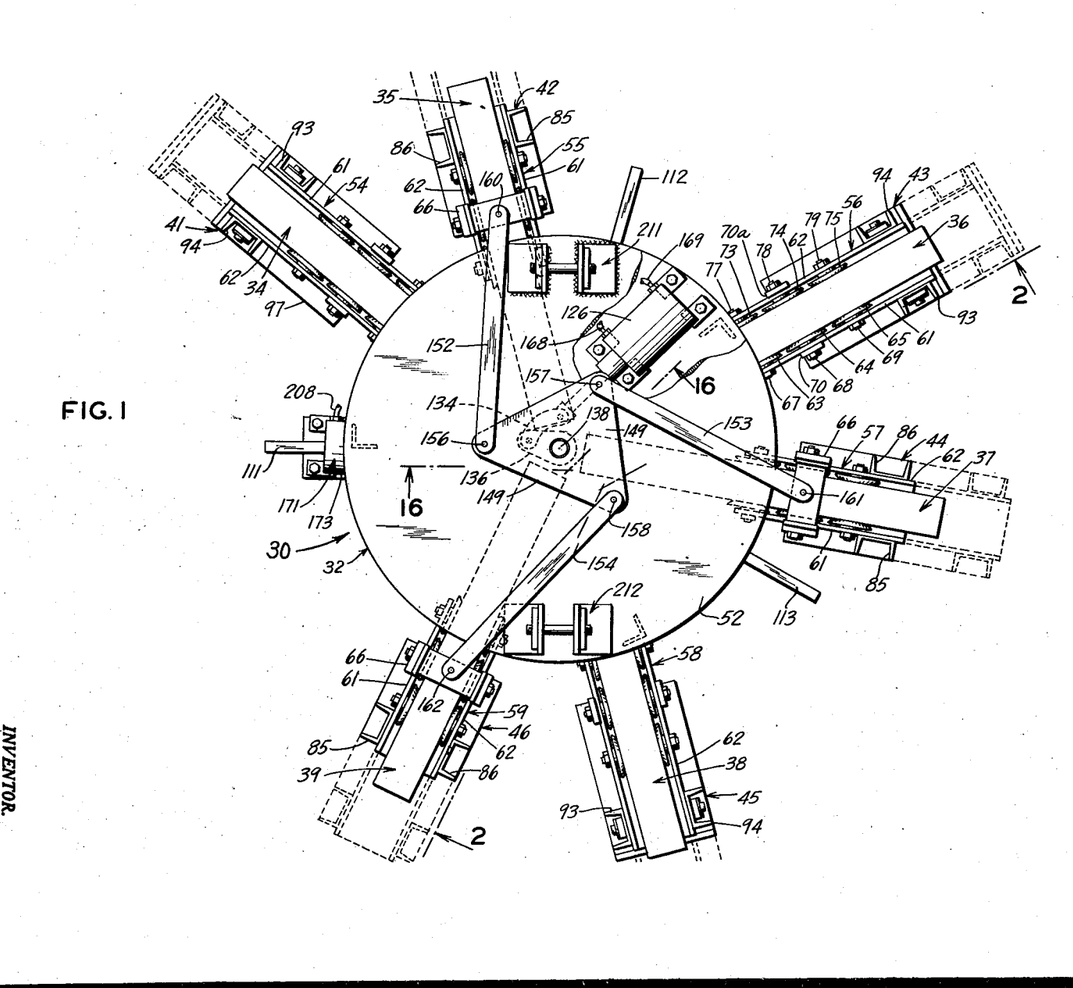
Fig. 1 is a top plan view of a grab embodying the principles of my invention.

In the drawings, the grab 30 shown to illustrate a preferred embodiment of my invention comprises, in general, a frame 32, including six substantially radially disposed legs 34, 35, 36, 37, 38 and 39, Fig. 1, on which are movably mounted elongated grappling arms 41, 42, 43, 44, 45 and 46, respectively, the grappling arms 41—46 being movable on the legs 34—39 toward and away from each other into and out of work-engaging position, as will be presently described in greater detail.

Figure 2:
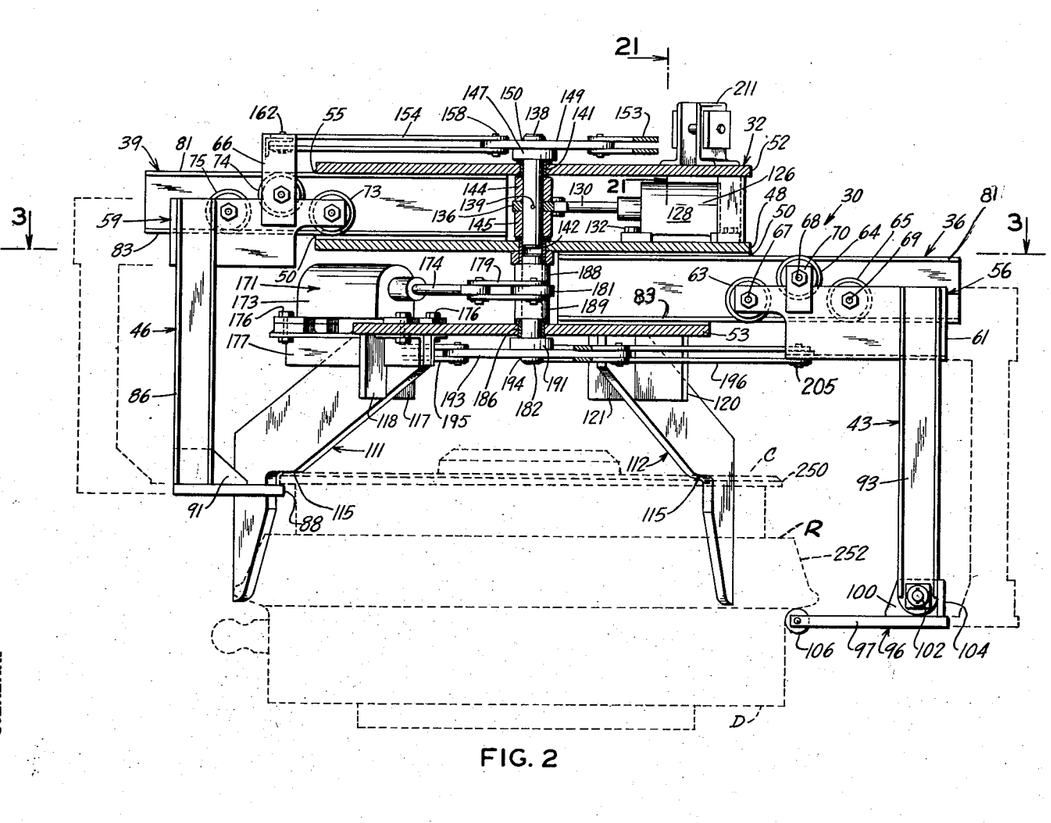
Fig. 2 is a sectional view taken substantially along the line 2—2 in Fig. 1.

The frame 32 comprises a central supporting plate or disk 48 on the upper surface of which the three legs 35, 37 and 39 are mounted, and on the lower surface of which the three legs 34, 36 and 38 are mounted, the legs 34—39 being attached to the disk 48 by suitable means such as welding 50, Fig. 2. The legs 34—39 comprise elongated I-beams mounted on the disk 48 in spaced relation to each other and project radially outwardly therefrom. Two other disks, namely, an upper disk 52 and a lower disk 53 are mounted on the top surface of the legs 35, 37 and 39, and the lower surface of the legs 34, 36 and 38, respectively, and may be attached thereto by any suitable means such as welding 55.

Six carriages 54, 55, 56, 57, 58 and 59 are mounted on the legs 34—39, respectively, and afford the means whereby the grappling arms 41—46, respectively, are suspended from the legs 34—39, as will be discussed in greater detail hereinafter. Each of the carriages 54—59 comprises two elongated substantially vertically disposed side plates 61 and 62, Fig. 5, connected together along the lower edge portions thereof by a bottom plate 60. Each of the carriages 55, 57 and 59 has an inverted U-shaped bracket 66 welded to the side plates 61 and 62 and projecting upwardly therefrom; and each of the carriages 54, 56 and 58 has two brackets or ears 70 and 70a, respectively, welded to, and projecting upwardly from, the side plates 61 and 62 thereof.

Three rollers 63, 64 and 65 are rotatably mounted on each of the carriages 54—59 by studs or bolts 67, 68 and 69, respectively, and are disposed substantially in axial alignment with three rollers 73, 74 and 75, respectively, likewise mounted on each of the carriages 54—59 by studs or bolts 77, 78 and 79. As is best seen in Figs. 1, 2 and 5, the rollers 64 and 74 are mounted on the brackets 66 or 70 and 70a of the carriages 55, 57 and 59, and the carriages 54, 56 and 58, respectively, in position to engage the upper flange 81 of the I-beam on which the respective carriage is mounted; and the pairs of rollers 63 and 65, and 73 and 75, are mounted on the side plates 61 and 62, respectively, of the carriages 54—59 in position to engage the lower flange 83 of the I-beam, with the pair of rollers 64 and 74 disposed between the two pairs of rollers 63 and 73, and 65 and 75, respectively, so that each of the carriages 54—59 is relatively well supported against tipping in either a lateral or longitudinal direction with respect to the legs 34—39 on which it is mounted.

Figure 4:
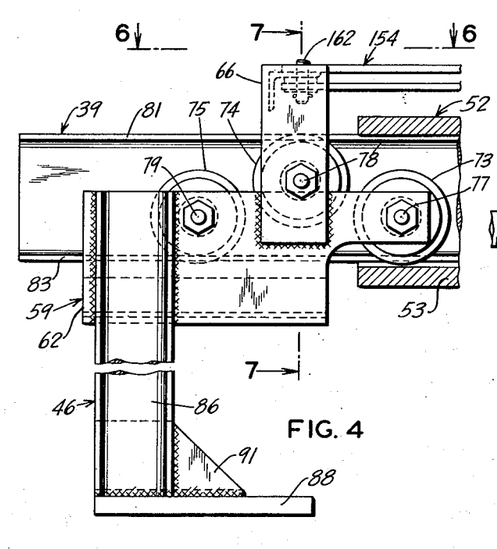
Fig. 4 is an enlarged detail sectional view of a portion of the grab shown in Fig. 2.
Figure 5:
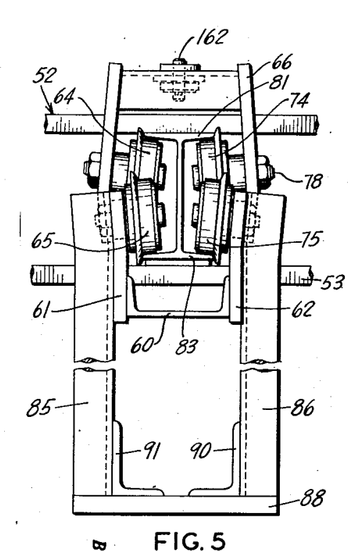
Fig. 5 is a left end elevational view of the portion of the grab shown in Fig. 4.
Figure 6:
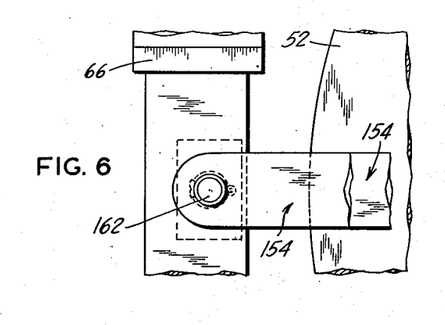
Fig. 6 is a detail sectional view taken substantially along the line 6—6 in Fig. 4.
Figure 7:
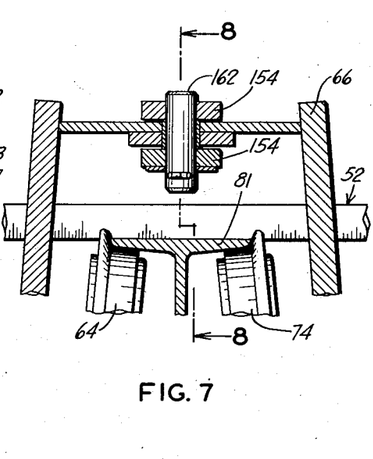
Fig. 7 is a detail sectional view taken substantially along the line 7—7 in Fig. 4.
Figure 8:
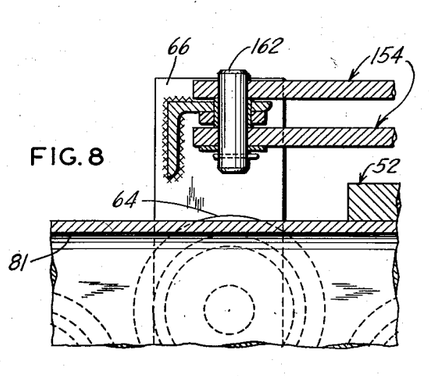
Fig. 8 is a detail sectional view taken substantially along the line 8—8 in Fig. 7.

Each of the grappling arms 42, 44 and 46 connected to the upper carriages 55, 57 and 59, respectively, includes two side members 85 and 86 which may be formed of any suitable material such as, for example, angle irons, Figs. 1, 4 and 5, welded to the outer surfaces of the side plates 61 and 62, respectively, of the respective carriage. A jaw member 88, comprising a substantially rectangular-shaped sheet metal member is welded to the lower end portions of the side members 85 and 86, and two angle irons 90 and 91 are welded to the lower end portions of the side members 85 and 86 and to the upper surface of the jaw member 88, in each of the grappling arms 42, 44 and 46 to thereby reinforce the interconnection of the jaw member 88 with the side members 85 and 86. The jaw members 88, on the grappling arms 42, 44 and 46 afford the normal work-engaging portions of the grappling arms, as will be discussed in greater detail presently.

Figure 9:
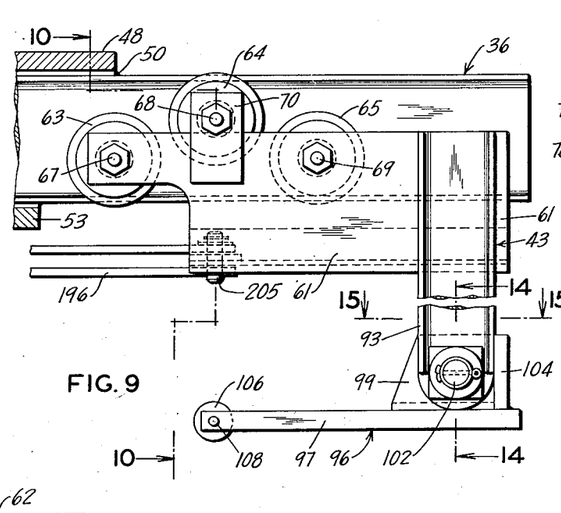
Fig. 9 is a detail sectional view of another portion of the grab shown in Fig. 2.
Figure 10:
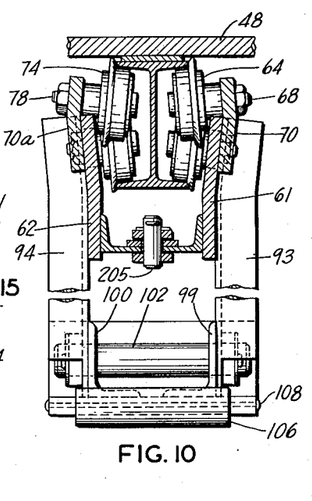
Fig. 10 is a right end elevational view of the portion of the grab shown in Fig. 9.
Figures 11, 12:
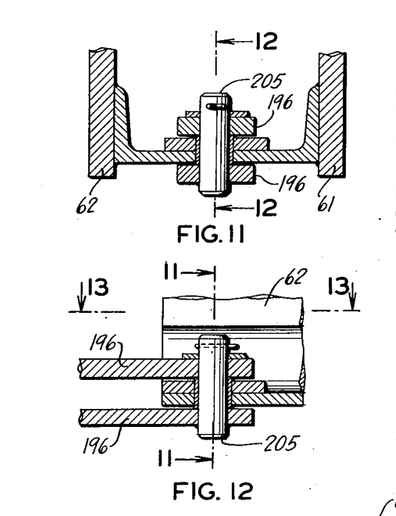
Fig. 11 is a detail sectional view of a portion of the grab shown in Fig. 10.
Fig. 12 is a detail sectional view taken substantially along the line 12—12 in Fig. 11.
Figures 13, 14:
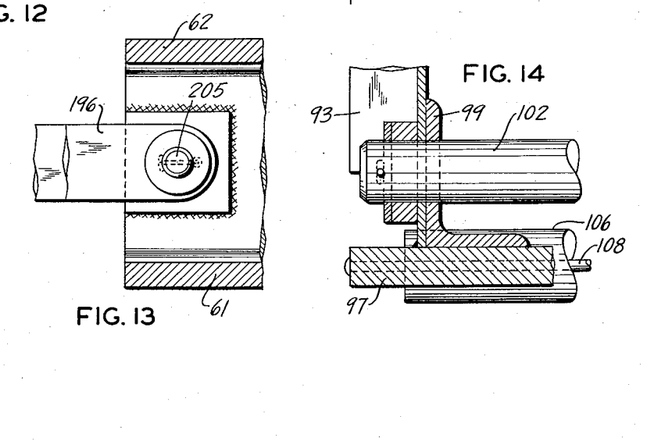
Fig. 13 is a detail sectional view taken substantially along the line 13—13 in Fig. 12.
Fig. 14 is a detail sectional view taken substantially along the line 14—14 in Fig. 9.
Figure 15:
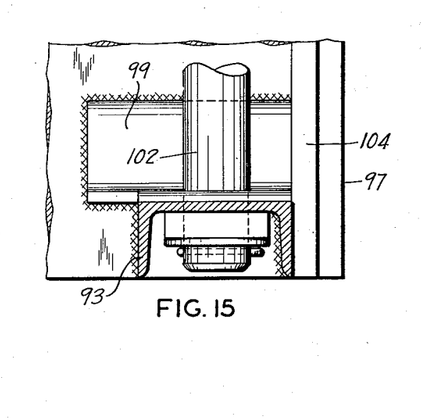
Fig. 15 is a detail sectional view taken substantially along the line 15—15 in Fig. 9.

Like the upper grappling arms 42, 44 and 46, the grappling arms 41, 43 and 45, mounted on the lower carriages 54, 56 and 58, also comprise two side members 93 and 94 welded to the side plates 61 and 62, respectively, and suspended therefrom. Also, each of the grappling arms 41, 43 and 45 includes a jaw member 96, Fig. 9, comprising a substantially rectangular-shaped plate 97 having two angle irons 99 and 100, Fig. 10, welded to the upper surface of one end portion thereof, the jaw member 96 being pivotally mounted between the side members 93 and 94 by suitable means such as a pin or shaft 102 extending through the lower end portions of the side members 93 and 94 and the upper flange of the angle irons 99 and 100, Figs. 9 and 10. The lower end portions of the side members 93 and 94 are rounded, Fig. 9, to thereby permit rotation of the jaw member 96 on the pin 102 relative thereto. However, it will be seen that a backing plate 104 is welded on the rear end portion of the sheet metal member 97 of the jaw member 96 and is engageable with the outer surface of the side members 93 and 94 to thereby limit rotation of the jaw member 96 in a counter-clockwise direction, as viewed in Fig. 9, so that the jaw member 96 may not be rotated in this direction beyond the horizontal position in which it is shown in Fig. 9. It will be seen, however, that the jaw member 96 may be rotated upwardly in a clockwise direction, as viewed in Fig. 9, to a position wherein the front or inner edge portion thereof engages the overlying side plates 61 and 62 of the carriage from which the jaw member 96 is suspended. A roller 106 is rotatably mounted on a pin 108 in the front end portion of the sheet metal member 97 and the jaw member 96 to facilitate insertion of the jaw member 96 under an article to be lifted, as will be discussed in greater detail presently.

Therefore, it will be seen that each of the grappling arms 41—46 comprises two elongated side members suspended by their upper end portions from a respective one of the carriages 54—59, and having a jaw member mounted on the lower end portion thereof which projects inwardly from the grappling arm toward the vertical center line of the frame 32 to thereby afford inwardly projecting members adapted to supportingly engage articles of work to be lifted by the grab, as will be apparent hereinafter.

Three substantially L-shaped guide plates 111, 112 and 113 are connected to the lower surface of the disk 53 of the supporting frame 30 by suitable means such as welding and are suspended therefrom in substantially radially disposed, spaced relation to each other. Each of the guide plates 111, 112 and 113 has a notch 115 formed in the lower end portion thereof which affords means for engaging the upper surface of a mold, or the like, when the latter is supported in normal position on the grappling arms 41—46, as will be discussed in greater detail hereinafter. Two reinforcing flanges 117 and 118, 120 and 121, and 123 and 124, are mounted on the upper end portions of the guide arms 111, 112 and 113, respectively, at opposite sides thereof and are engaged with the lower surface of the aforementioned bottom disk 53 to thereby afford efficient lateral support for the guide arms 111—113.

A power unit 126, Figs. 1 and 2, comprising a cylinder or housing 128 within which is reciprocably mounted a plunger 130, is mounted on the outer peripheral edge surface of the top of the supporting disk 48 and is secured thereto by suitable means such as bolts 132. The outer end portion of the plunger 130 is connected by a link 134, Figs. 1 and 2, to a crank 136 connected to a shaft 138 by suitable means such as a pin 139. The shaft 138 is journaled in bushings 141 and 142 mounted in the central portion of the supporting disks 52 and 50, respectively, Figs. 1 and 2, and spacer sleeves 144 and 145 are mounted on the shaft 138 above and below the crank 136 between the crank 136 and the bushings 141 and 142, respectively. Thus, it will be seen that the shaft 138 is rotatably mounted in the bushings 141 and 142 and is held against longitudinal displacement therefrom by the pin 139 and the spacer sleeves 144 and 145.

Figure 16:
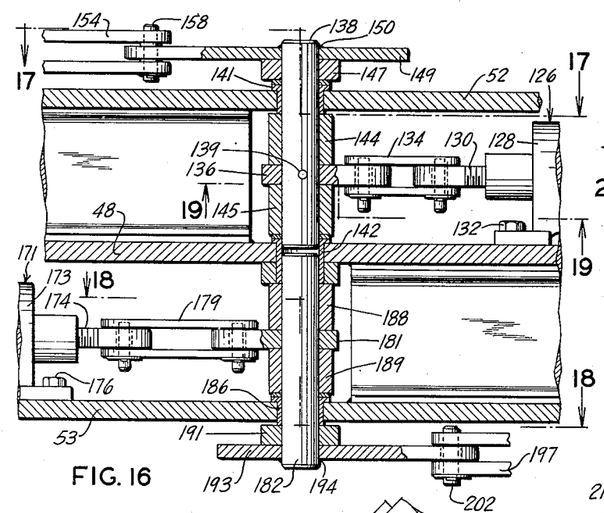
Fig. 16 is a detail sectional view of another portion of the grab shown in Fig. 2, showing the parts thereof in a different position of operation.
Figure 17:
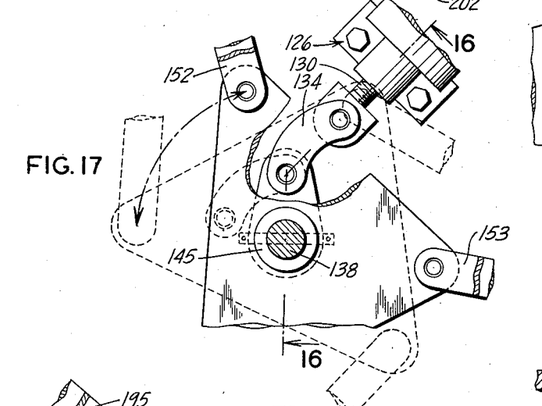
Fig. 17 is a detail sectional view taken substantially along the line 17—17 in Fig. 16.
Figure 18:
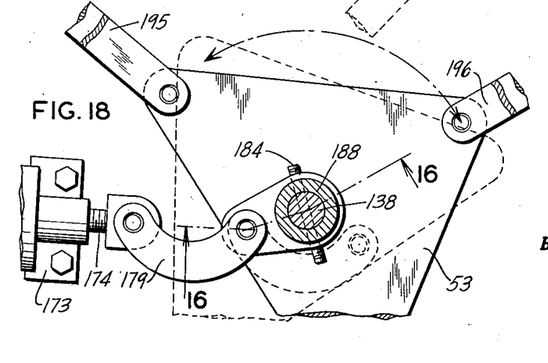
Fig. 18 is a detail sectional view taken substantially along the line 18—18 in Fig. 16.
Figure 19:
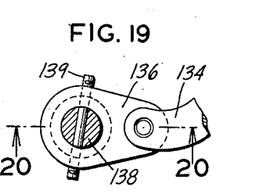
Fig. 19 is a detail sectional view taken substantially along the line 19—19 in Fig. 16.

A supporting collar 147 is mounted on the upper end portion of the shaft 138 above the supporting disk 52 and a triangular-shaped plate 149, Figs. 1, 2 and 16, is mounted on the upper end portion of the shaft 138 in engagement with the supporting collar 147 and is connected to the shaft 138 by suitable means such as welding 150 for rotation therewith.

Three links 152, 153 and 154 are connected at one end by pins 156, 157 and 158 to the respective apexes of the triangular plate 149 and are connected at their opposite end portions by pins 160, 161 and 162 to the brackets 66 mounted on the carriages 42, 44 and 46, respectively, and afford interconnections between the carriages 42, 44 and 46 and the triangular plate 149 whereby upon rotation of the plate 149 the carriages 42, 44 and 46 may be caused to reciprocate on the legs 35, 37 and 39, respectively.

Thus, it will be seen, that as best shown in Figs. 1 and 2, reciprocation of the plunger 130 relative to the cylinder 128 of the power unit 126 is effective through the interconnection of the plunger 130 with the carriages 42, 44 and 46 by the link 134, the crank 136, the shaft 138, the triangular plate 149, and the links 152, 153 and 154, respectively, to cause the carriages 55, 57 and 59 and, therefore, the grappling arms 42, 44 and 46 to move toward and away from each other on the legs 35, 37 and 39, respectively. The power unit 126 may be one of several types which are well known to those skilled in the art, but I prefer to use a pneumatically or hydraulically operated power unit wherein the plunger 120 may be caused to reciprocate in the cylinder 128 by feeding working fluid such as compressed air, or the like, alternately into and out of the cylinder 128 through suitable means, such as, coupling members 168 and 169 mounted on the opposite end portions of the cylinder 128, Fig. 1.

Figure 3:
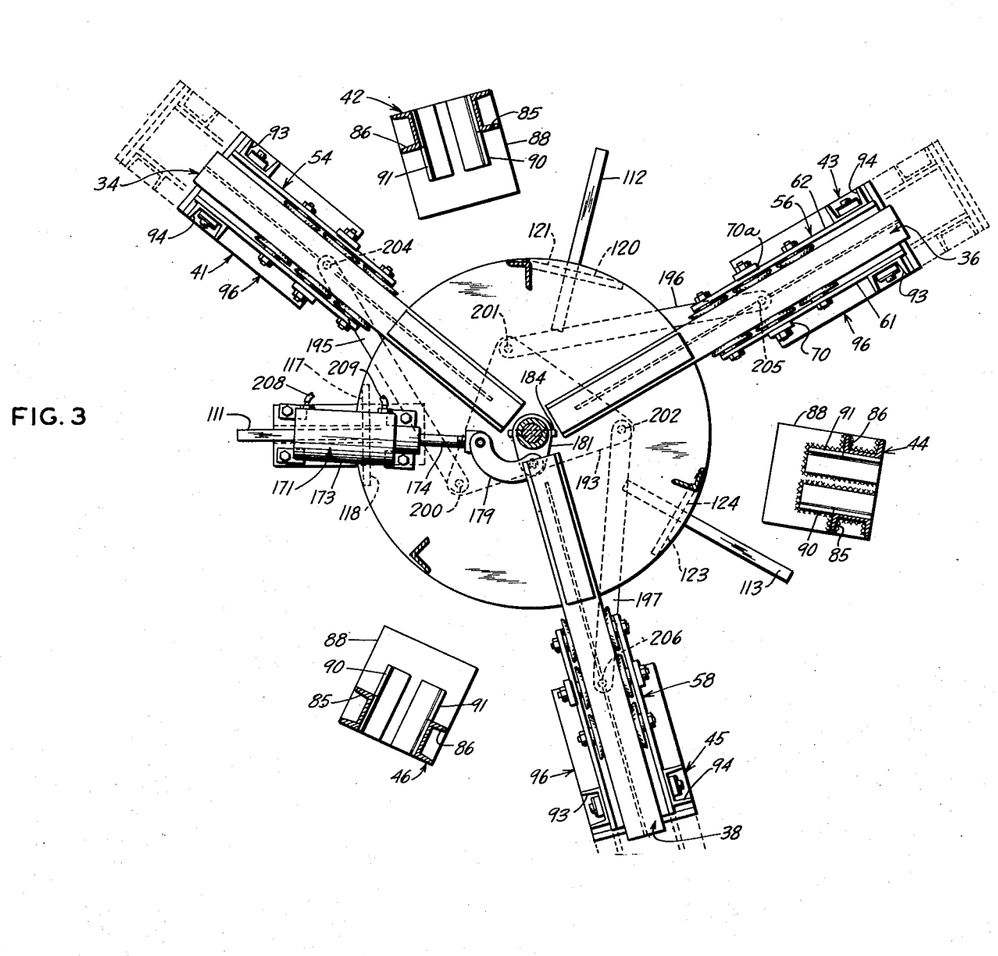
Fig. 3 is a sectional view taken substantially along the line 3—3 in Fig. 2.

Another power unit 171, comprising a cylinder or housing 173 in which is reciprocably mounted a plunger 174 is mounted on the outer peripheral edge surface of the top of the supporting disk 53 and is secured thereto by suitable means such as bolts 176 and a bracket 177. The inner end portion of the plunger 175 is connected by a link 179, Figs. 2 and 3, to a crank 181 mounted on a shaft 182 and secured thereto by suitable means such as a pin 184. The shaft 182 is disposed in vertical position between the supporting disks 48 and 53, with the upper end portions thereof journaled in the bushing 142 in the disk 48, and the lower end portion thereof journaled in a bushing 186 mounted in the central portion of the supporting disk 53. Two spacing sleeves 188 and 189 are mounted on the shaft 182 between the crank 181 and the bushings 142 and 186, respectively, and afford means whereby the shaft 182 is retained against longitudinal displacement from the bushings 142 and 186. A supporting collar 191 is mounted on the lower end portion of the shaft 182 and a triangular-shaped plate 193 is mounted on the shaft 182 below the collar 191 and is secured to the shaft 182 by suitable means such as welding 194 for rotation therewith. In a manner similar to that in which the triangular plate 149 is connected to the upper carriages 55, 57 and 59, the triangular plate 193 is connected to the carriages 54, 56 and 58 by links 195, 196 and 197, the links 195—197 being connected at one end portion to the respective apexes of the triangular plate 193 by pins 200, 201 and 202, respectively, and the other end portions of the links 195—197 being connected by pins 204, 205 and 206 to the bottom plate 60 of the carriages 54, 56 and 57, respectively, Figs. 3, 9, 11 and 12.

Thus, it will be seen that, similarly to the manner in which the power unit 126 is effective to reciprocate the grappling arms 42, 44 and 46, the cylinder 173 of the power unit 171 is effective, through reciprocation of the plunger 174, to move the carriages 54, 56 and 58 and, therefore, the grappling arms 41, 43 and 45 toward and away from each other on the legs 34, 36 and 38, respectively, the interconnection of the plunger 174 with the carriages 54, 56 and 58 being effected through the link 179, the collar 181, the shaft 182, the triangular plate 193, and the links 195, 196 and 197, respectively. The power unit 171, like the power unit 126, may be any one of several types which are well known to those skilled in the art, but I prefer to use a pneumatically or hydraulically operated power unit 171 wherein a plunger is caused to reciprocate in the cylinder 128 by feeding working fluid such as compressed air, or the like, into and out of the cylinder 128 through suitable means such as coupling members 208 and 209, Fig. 3, mounted on opposite end portions of the housing 173.

Figure 20:
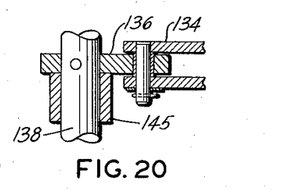
Fig. 20 is a detail sectional view taken substantially along the line 20—20 in Fig. 19.
Figure 21:
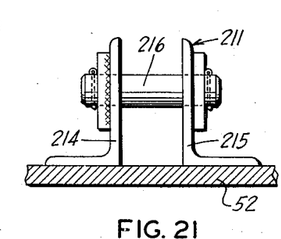
Fig. 21 is a detail sectional view taken substantially along the line 21—21 in Fig. 2.
Figure 22:
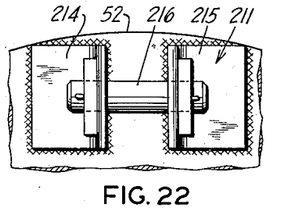
Fig. 22 is a top plan view of that portion of the grab shown in Fig. 21.

Suitable lifting means such as, for example, U-shaped members 211 and 212, Figs. 1, 20 and 21, may be mounted on opposite end portions of the frame 32 to afford means whereby the grab 30 may be readily engaged by a suitable lifting member such as the customary hooks on a power hoist, or the like, for the purpose of lifting and transporting the grab. The U-shaped members 211 and 212 shown in the drawings, each comprises two angle brackets 214 and 215, Figs. 21 and 22, mounted on the upper surface of the supporting disk 52 and projecting upwardly therefrom, a shaft 216 being mounted in the upwardly projecting portion of the brackets 214 and 215 and affording the supporting member engageable by a hook or the like for lifting the grab 30.

It will be seen that my novel grab 30 is especially well adapted for supportingly engaging molds and the like, of other than the conventional forms, such as, for example, wheel molds, and the like, the grappling arms 42, 44 and 46, and the grappling arms 41, 43 and 45, affording means whereby the upper and lower portions of the mold may each be supported from three points, and the grappling arms 41—46 are adapted to be readily swung toward and away from each other under positive pressure applied by the power units 126 and 171 to thereby move the grappling arms into and out of work-engaging position.

In the operation of the grab 30 working fluid such as, for example, compressed air, may be fed into the cylinders 128 and 173 through the couplings 168 and 209 to thereby cause the plungers 130 and 174 to be moved inwardly relative to the cylinders 128 and 173, respectively, from the positions shown in Fig. 2 to the positions shown in Fig. 16. Such inward movement of the plungers 130 and 174 is effective through the aforementioned interconnection thereof with the upper grappling arms 42, 44 and 46, and the lower grappling arms 41, 43 and 45, respectively, to move the grappling arms outwardly toward the positions shown in dotted lines in Figs. 1, 2 and 3, so that the jaws 88 and 96 on the grappling arms may be lowered over the article to be engaged thereby. After the grab 30 has thus been lowered over the article to be engaged, working fluid may be fed into the cylinders 128 and 173 through the coupling members 169 and 208, respectively, to thereby move the plungers 130 and 174 outwardly relative to the cylinders 128 and 173 and thereby move the grappling arms 42, 44 and 46 and the grappling arms 41, 43 and 45, respectively, into engagement with the article of work disposed therebetween. Usually, projections or lugs are afforded on the article to be raised by the grab 30 to thereby provide members under which the jaws 88 and 96 may be engaged. However, if no such projections are afforded the jaws 88 and 96 may be disposed beneath the article to be afforded or, if necessary, may be merely pressed into firm frictional engagement with the side walls of the article to be supported, the power units 126 and 171 preferably being of the type which, when necessary, are capable of exerting a substantial inwardly acting force on the grappling arms 41—46.

It will be seen that the parts of my novel grab 30, and especially the guide arms 111—113 and the grappling arms 41—46 are constituted and arranged in such a manner that the grab is especially well adapted for use in picking up and transporting the cope and chiller ring of a wheel mold. When so used, it will be seen that the jaws 88 on the grappling arms 42, 44 and 46 may be engaged with suitable means such as a flange 250 afforded on the cope C of such a mold, Fig. 2, and the jaws 96 may be disposed beneath a suitable portion of the chiller such as, for example, the flange 252 afforded on the chiller-ring R shown in the accompanying drawings. When so engaged with the cope and chiller-ring, the grappling arms 42, 44 and 46, and the grappling arms 41, 43 and 45, are effective to press the upper surface of the cope into the notches 115 afforded in the lower end portion of the guide arms 111, 112 and 113, and are also effective to hold the cope and chiller-ring in assembled relation relative to each other. Furthermore, it will be noted that if desired, after the cope and chiller-ring have been raised a short distance from the drag D of the mold, the grappling arms 41, 43 and 45 may be moved inwardly somewhat to thereby dispose the jaw members 96 thereof beneath the open end portion of the chiller-ring to thereby positively hold the wheel or other casting in assembled relation to the cope and chiller-ring and thereby insure that the casting will not be accidentally dropped from the cope and chiller-ring during transportation thereof. It will be seen that the rollers 106 afforded on the inner end portions of jaw members 96 enable the jaw members 96 to be moved under the casting disposed in the chiller-ring relatively easily.

Also, it will be seen that with my novel grab 30 the casting, chiller-ring and cope may be deposited on the shake-out device in a plurality of different combinations. For example, it will be seen that if it is desired to deposit the chiller-ring and casting at a common station and to deposit the cope at another station, this may be readily accomplished by first supportingly engaging the upper arms 42, 44 and 46 of the grab with the cope, and engaging the lower grappling arms 41, 43 and 45 with the drag; and then transporting the grab and the work engaged thereby to the first station; actuating the power unit 171 in a manner whereby the grappling arms 41, 43 and 45 are moved outwardly sufficiently to disengage from the chiller-ring R to thereby drop the chiller-ring and the casting from the cope C; and thereafter transporting the grab 30, with the cope C still engaged by the arms 42, 44 and 46 thereof, to the second station where the power unit 126 may be actuated to effect outward movement of the grappling arms 42, 44 and 46 to thereby release the cope and deposit the same in the latter desired position.

If, on the other hand, it is desired to deposit the casting at one position, the chiller-ring at another position, and the cope at still another position, this also may be readily accomplished with my novel grab by transporting the grab 30 to the first position and then actuating the power unit 171 sufficiently in a manner to move the jaws 96 outwardly out of engagement with the casting disposed in the chiller-ring but not sufficiently to disengage the jaws 96 from the chiller-ring itself. Thereafter, the grab 30 may be jarred sufficiently to dislodge the casting from the cope and chiller-ring and thereby deposit the casting in the aforementioned first position. Subsequently, the grab 30 may be transported to the second position and the power unit 171 may again be actuated to completely disengage the jaws 96 from the chiller-ring R and thereby release the chiller-ring from the cope C and deposit the chiller-ring in the second position. Subsequently, the grab 30 may be moved to the third position and the power unit 126 actuated to deposit the cope in this last mentioned position.

Thus it will be seen that I have afforded a novel grab which is especially well adapted for use in supporting and transporting wheel molds and the like wherein the article to be transported embodies upper and lower portions which are separable from each other but which, during the transportation thereof, it is desired to retain in assembled position relative to each other.

Furthermore, it will be seen that I have afforded a novel grab whereby wheel molds and the like may be transported in such a manner that the wheel is positively supported in the cope and chiller-ring of the mold during transportation thereof so that it is assured that the wheel will not be accidentally dislodged from the cope and chiller-ring during such transportation.

Also, it will be seen that I have afforded a novel grab wherein, although the various grappling arms may be selectively actuated, the grappling arms are so constituted and arranged that they cooperate with each other in supporting articles of work such as wheel molds, and the like, wherein separable upper and lower portions of the article of work may be positively held together during predetermined stages of such transportation.

Also, it will be seen that I have afforded a novel grab wherein the grappling arms thereof are operable to be moved in a positive manner in both work-engaging and disengaging direction.

Furthermore, it will be seen that I have afforded a novel grab of the aforementioned type which is efficient in operation and which may be economically produced commercially.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a grab of the type adapted to support a mold having upper and lower portions that are separable from each other, a supporting frame, and a plurality of grappling arms mounted on said frame in an annular series with each of said arms being slidably movable on said frame radially of said series into and out of a predetermined position, alternate ones of said arms being positioned to supportingly engage said upper and lower portions, respectively, of such a mold when disposed in said predetermined position.

2. A grab of the type adapted to support a mold having separable upper and lower portions, said grab comprising a supporting frame adapted to be disposed in a predetermined position relative to such a mold, a plurality of grappling arms mounted on said frame and movable toward and away from each other, into and out of supporting position relative to the said upper portion of such a mold when said frame is disposed in said predetermined position, a plurality of other grappling arms mounted on said frame and movable toward and away from each other, into and out of supporting position relative to the said lower portion of such a mold when said frame is disposed in its said predetermined position, and means for selectively moving said first mentioned grappling arms toward each other, and said other grappling arms toward each other, into simultaneous supporting engagement with the said upper and lower portions of such a mold, respectively, when said frame is disposed in said predetermined position to thereby positively support said upper and lower portions of said grab from said frame.

3. A grab of the type adapted to support a mold having separable upper and lower portions, with the said lower portion having an open bottom, said grab comprising a supporting frame adapted to be disposed in a predetermined position relative to such a mold, a plurality of grappling arms suspended from said frame and movable horizontally relative thereto into and out of supporting engagement with the said upper portion of such a mold when said frame is disposed in said predetermined position, a plurality of other grappling arms suspended from said frame and movable horizontally relative thereto into and out of supporting engagement with the said lower portion of such a mold when said frame is disposed in said predetermined position, said other grappling arms having supporting members operable to project inwardly below said open bottom of the said lower portion of such a mold in supporting relation thereto when said other grappling arms are disposed in said supporting engagement with said lower portion, and means mounted on said frame for moving said first mentioned grappling arms and said other grappling arms horizontally into and out of said supporting engagement with such a mold.

4. A grab of the type adapted to support a mold, or the like, having separable upper and lower portions, said grab comprising a supporting frame adapted to be disposed in a predetermined position relative to such a mold, a plurality of carriages mounted on said frame and movable relative thereto into and out of a predetermined position relative to said frame, a plurality of grappling arms mounted on said carriages, each of said grappling arms being suspended from a respective one of said carriages and movable therewith into and out of said predetermined position relative to said frame, predetermined ones of said grappling arms being positioned when disposed in said last mentioned position to supportingly engage said upper portion of such a mold, predetermined other ones of said grappling arms being positioned when disposed in said predetermined position relative to said frame to supportingly engage said lower end portion of such a mold, and means connected to said carriages for moving said carriages and said grappling arms into and out of said predetermined position relative to said frame.

5. A grab of the type adapted to support a separable article such as a mold, or the like, having separable upper and lower portions, said grab comprising a supporting frame, a plurality of carriages mounted on said frame and movable radially relative thereto toward and away from each other, a plurality of grappling arms mounted an said carriages and movable therewith relative to each other into and out of supporting engagement with such a mold when said mold is disposed in predetermined position relative to said frame, predetermined ones of said grappling arms projecting from said frame to a position for said radial movement into engagement with said lower portion of said mold, and other ones of said grappling arms projecting from said frame to a position for said radial movement into engagement with said upper portion of said mold, and means for moving said carriages radially of said frame toward and away from each other to thereby move said grappling arms into and out of said supporting engagement with the said mold.

6. A grab of the type adapted to support a separable article such as a mold, or the like, having upper and lower portions separable from each other, said grab comprising a supporting frame, a plurality of elongated guide arms mounted on said frame and projecting downwardly therefrom and having a downwardly facing portion for engaging the top of such an article, a plurality of grappling arms mounted on said frame and projecting downwardly therefrom, said grappling arms extending below said downwardly facing portions on said guide arms and being movable radially inwardly and outwardly in a horizontal direction relative to said frame, predetermined ones of said grappling arms extending below other of said grappling arms, said other grappling arms being positioned to supportingly engage the said upper portion of such a mold when disposed in a predetermined position to thereby support said upper portion of said mold in engagement with said downwardly facing portion of said guide arms, said predetermined grappling arms being positioned to supportingly engage the said lower portion of said last mentioned mold when disposed in a predetermined position to support said lower portion in closed relation to said upper portion and assist said other grappling arms in supporting said upper portion of said mold in engagement with said downwardly facing portions of said guide arms, and means for moving said grappling arms radially of said frame into and out of said predetermined positions.

7. A grab for picking up and supporting articles of work, said grab comprising a supporting frame including a plurality of radially disposed elongated supporting legs, a plurality of carriages mounted on said legs and movable longitudinally thereof, each of said carriages being mounted on and supported by a respective one of said legs, a plurality of elongated grappling arms each having an upper end portion and a lower end portion and each being suspended by its upper end portion from a respective one of said carriages, predetermined ones of said grappling arms extending below the other ones of said grappling arms, each of said grappling arms being adapted to be moved with said carriages into and out of article-supporting position upon reciprocation of said carriages along said legs, and means connected to said carriages for reciprocating said carriages along said legs to thereby move said grappling arms into and out of said article-supporting position.

8. A grab for picking up and supporting articles of work, said grab comprising a supporting frame including a plurality of radially disposed elongated supporting legs, predetermined ones of said legs being disposed in one common plane, and other ones of said legs being disposed in another common plane, a plurality of carriages mounted on said legs and movable longitudinally thereof, each of said carriages being mounted on a respective one of said legs, two groups of elongated grappling arms, each of said grappling arms having an upper end portion and a lower end portion and being suspended by its upper end portion from a respective one of said carriages, said grappling arms in one of said groups being suspended from carriages mounted on legs in said one plane, and said grappling arms in the other of said groups being suspended from carriages mounted on legs in the other of said planes, said lower end portion of said grappling arms in said one group being movable with said carriages into a predetermined position for supportingly engaging the upper end portion of such an article of work, said lower end portion of said grappling arms in the said other of said groups projecting below said lower end portions of said grappling arms in said one group and being movable with said carriages into a predetermined position for supportingly engaging the lower end portion of such an article of work, and means for moving said carriages longitudinally of said legs to thereby move said grappling arms in said groups into and out of said predetermined positions.

9. A grab for picking up and supporting articles of work having upper and lower portions that are separable from each other, said grab comprising a plurality of radially projecting elongated legs, each having a top wall and a bottom wall, a plurality of carriages mounted on said legs and movable longitudinally thereof, each of said carriages being mounted on a respective one of said legs and including a plurality of rollers engageable with the said top and bottom walls thereof, a plurality of grappling arms mounted on and suspended from said carriages, certain of said grappling arms extending below the other of said grappling arms, each of said arms being suspended from a corresponding one of said carriages and being movable therewith relative to said legs, and means for moving said carriages longitudinally of said legs to thereby move said grappling arms into work-engaging positions wherein said arms are adapted to engage respective portions of such an article of work to thereby support said article of work with said upper and lower portions thereof in closed position relative to each other.

10. A grab for picking up and supporting a wheel mold, or the like, having upper and lower portions that are separable from each other, said grab comprising a supporting frame including a plurality of legs projecting radially from a common center, a plurality of grappling arms mounted on said legs and movable thereon relative to each other into and out of work-engaging position, and means rotatably mounted between said legs at said common center, said means being rotatable around said common center as an axis and being operatively connected to said arms for moving said arms on said legs relative to each other into and out of work-engaging position upon rotation of said means around said center.

11. A grab for picking up and supporting a wheel mold, and the like, having upper and lower portions that are separable from each other, said grab comprising a supporting frame including a plurality of radially projecting legs, a plurality of grappling arms mounted on said legs with each of said arms being suspended from and movable longitudinally of a respective one of said legs, each of said arms having a work-engaging portion adapted to engage a portion of such a mold in supporting relation thereto when disposed in a predetermined position on said respective leg, said work-engaging portion on predetermined ones of said arms being so disposed when said arms are in said position to so engage the said upper end portion of such a mold, and said work-engaging portion on the other of said arms being so disposed when said arms are in said position to so engage the said lower end portion of such a mold, and means rotatably mounted between said legs and connected to said arms for moving said arms into and out of said predetermined position.

12. A grab for picking up and supporting a wheel mold, or the like, having upper and lower portions that are separable from each other, said grab comprising a supporting frame including two groups of radially projecting legs, one of said groups of legs being disposed in one common plane and the other of said groups of legs being disposed in another common plane in parallel relation to said one group, a plurality of grappling arms mounted on said legs and movable thereon relative to each other into and out of work-engaging position, said arms mounted on said one group of legs being adapted to support the said upper portion of such a mold when said arms are disposed in said work-engaging position, and said arms mounted on said other group of legs being adapted to support the said lower portion of such a mold when said last mentioned arms are disposed in said work-engaging position, means operatively connected to said arms in both of said groups and operable upon rotation to move said arms relative to said legs into and out of said work-engaging position, and means rotatably supporting said first mentioned means between said legs.

13. A grab for picking up molds, and the like, having upper and lower portions that are separable from each other, said grab comprising a supporting frame including two groups of elongated I-beams projecting radially outwardly from a common axis, each of said I-beams having a vertically disposed web and horizontally disposed upper and lower flanges, one of said groups of I-beams being disposed in one common plane and the other of said groups being disposed in another common plane in parallel relation to said one plane, a plurality of carriages mounted on said I-beams and movable longitudinally thereof, each of said carriages being mounted on a respective one of said I-beams and including rollers disposed between the said flanges thereof and in engagement therewith to insure against vertical displacement of said carriages relative to said I-beams, a plurality of grappling arms mounted on and suspended from said carriages and movable therewith toward and away from each other into and out of a predetermined position, said arms mounted on carriages on said one group of I-beams being adapted to supportingly engage the upper portion of such a mold when said carriages are disposed in said predetermined position, and said arms mounted on carriages on said other group of I-beams being adapted to supportingly engage the lower portion of such a mold when said carriages are disposed in said predetermined position, and means rotatably mounted on said frame along said common axis and operably connected to said carriages and operable upon rotation to move said carriages and said arms into and out of said predetermined position, and means mounted on said frame and connected to said last named means for rotating said last named means.

14. A grab for picking up and supporting a wheel mold, or the like, having upper and lower portions that are separable from each other, said grab comprising a supporting frame including a plurality of elongated outwardly projecting legs, a plurality of grappling arms mounted on said legs and movable thereon longitudinally thereof into and out of work-engaging position, means rotatably mounted between said legs on a vertical axis transverse to the length of said legs, and elongated link members, operatively connected to said arms and said means, for moving said arms on said legs relative to each other into and out of said work-engaging position upon rotation of said means about said axis and relative to said legs.

WALTER J. OLSON.

References Cited in the file of this patent

UNITED STATES PATENTS

| Number | Name | Date |
|---|---|---|
| 954,584 | Penfield | Apr. 12, 1910 |
| 1,544,011 | Kearns et al. | June 30, 1925 |
| 1,615,115 | Durhan | Jan. 18, 1927 |
| 1,865,739 | Bergmann | July 5, 1932 |
| 2,087,877 | Ralston et al. | July 20, 1937 |
| 2,120,639 | Buente | June 14, 1938 |
| 2,138,498 | McMillan | Nov. 20, 1938 |
| 2,284,238 | Todd | May 26, 1942 |